(12) United States Patent
Kerin et al.

(10) Patent No.: US 7,497,480 B2
(45) Date of Patent: Mar. 3, 2009

(54) HYBRID QUICK CONNECTOR

(75) Inventors: Jim Kerin, Grosse Pointe Woods, MI (US); Richard M. Pepe, Macomb, MI (US); Robert A. Koshay, Macomb, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 230 days.

(21) Appl. No.: 11/528,084

(22) Filed: Sep. 27, 2006

(65) Prior Publication Data

US 2007/0236012 A1 Oct. 11, 2007

Related U.S. Application Data

(60) Provisional application No. 60/790,127, filed on Apr. 7, 2006.

(51) Int. Cl.
*F16L 37/00* (2006.01)
(52) U.S. Cl. .......................... 285/305; 285/382
(58) Field of Classification Search ................ 285/305, 285/308, 239, 319, 382, 286.2
See application file for complete search history.

(56) References Cited

U.S. PATENT DOCUMENTS

| | | | |
|---|---|---|---|
| 4,707,000 A * | 11/1987 | Torgardh | 285/305 |
| 4,869,534 A | 9/1989 | Ketcham et al. | |
| 4,948,175 A | 8/1990 | Bartholomew | |
| 5,320,390 A * | 6/1994 | Kodama et al. | 285/308 |
| 5,395,140 A | 3/1995 | Wiethorn | |
| 5,401,063 A | 3/1995 | Plosz | |
| 5,423,577 A | 6/1995 | Ketcham | |
| 5,586,792 A | 12/1996 | Kalahasty et al. | |
| 5,593,187 A | 1/1997 | Okuda et al. | |
| 5,628,531 A | 5/1997 | Rosenberg et al. | |
| 5,649,724 A | 7/1997 | Wiethorn | |
| 5,752,726 A * | 5/1998 | Fixemer | 285/39 |
| 5,782,502 A | 7/1998 | Lewis | |
| 5,855,398 A | 1/1999 | Reinholz | |
| 5,863,077 A | 1/1999 | Szabo et al. | |
| 5,873,610 A * | 2/1999 | Szabo | 285/319 |
| 5,897,142 A * | 4/1999 | Kulevsky | 285/308 |
| 5,897,145 A | 4/1999 | Kondo et al. | |
| 5,931,509 A | 8/1999 | Bartholomew | |
| 6,082,779 A | 7/2000 | Lesser et al. | |
| 6,155,612 A * | 12/2000 | Szabo | 285/319 |
| 6,318,764 B1 * | 11/2001 | Trede et al. | 285/305 |
| 6,386,596 B1 * | 5/2002 | Olson | 285/321 |
| 6,517,120 B1 * | 2/2003 | Miyajima et al. | 285/305 |

(Continued)

FOREIGN PATENT DOCUMENTS

EP 1 561 990 A1 8/2005

(Continued)

*Primary Examiner*—David E Bochna
(74) *Attorney, Agent, or Firm*—Leydig, Voit & Mayer, Ltd.

(57) ABSTRACT

A quick connector coupling comprising a connector body having a retainer housing and a separate stem. The retainer housing defines a through bore extending axially rearward from a male member reception end. The retainer housing includes a generally cylindrical spacer portion. The stem defines a through bore extending axially rearward from a housing reception end. The stem includes a spacer housing portion overlying the spacer portion of the retainer housing. The spacer housing portion is crimped or roll grooved radially inward to secure the stem to the retainer housing.

24 Claims, 11 Drawing Sheets

U.S. PATENT DOCUMENTS

| | | |
|---|---|---|
| 6,637,779 B2 | 10/2003 | Andre |
| 6,709,026 B2 * | 3/2004 | Sausner et al. .............. 285/305 |
| 6,772,703 B2 | 4/2004 | Takayanagi |
| 6,846,021 B2 | 1/2005 | Rohde et al. |
| 6,866,303 B2 | 3/2005 | Szabo et al. |
| 6,902,206 B2 | 6/2005 | Zenko et al. |
| 6,905,143 B2 | 6/2005 | Klinger et al. |
| 7,014,220 B2 | 3/2006 | Szabo et al. |
| 7,029,036 B2 | 4/2006 | Andre |
| 2003/0178844 A1 | 9/2003 | Klinger et al. |
| 2004/0036283 A1 | 2/2004 | Furuya |
| 2005/0200125 A1 | 9/2005 | Andre |
| 2005/0236833 A1 | 10/2005 | Poirier et al. |
| 2005/0258646 A1 | 11/2005 | Gunderson |
| 2006/0145475 A1 | 7/2006 | Walker et al. |

FOREIGN PATENT DOCUMENTS

| | | |
|---|---|---|
| WO | WO 96/34224 A1 | 10/1996 |

\* cited by examiner

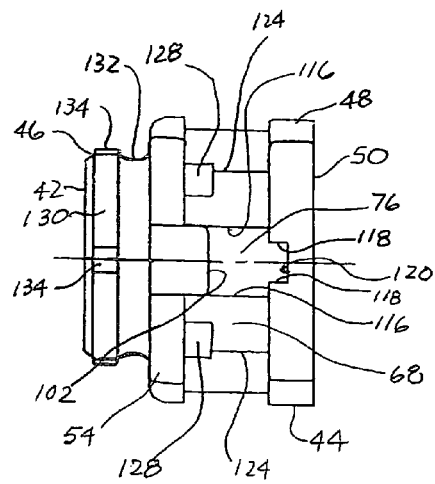
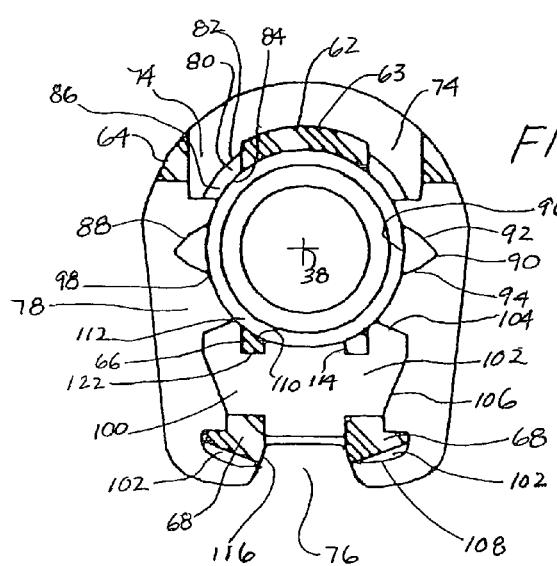
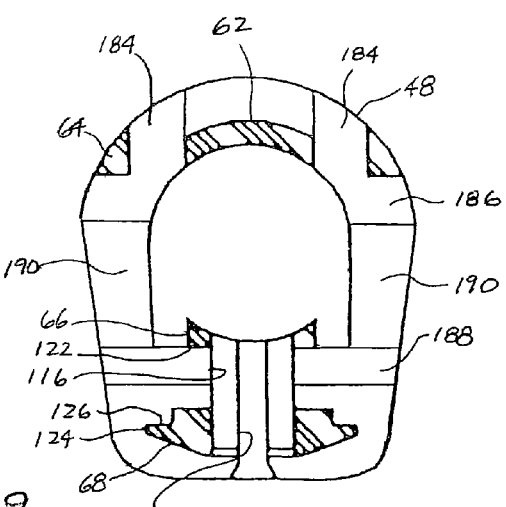

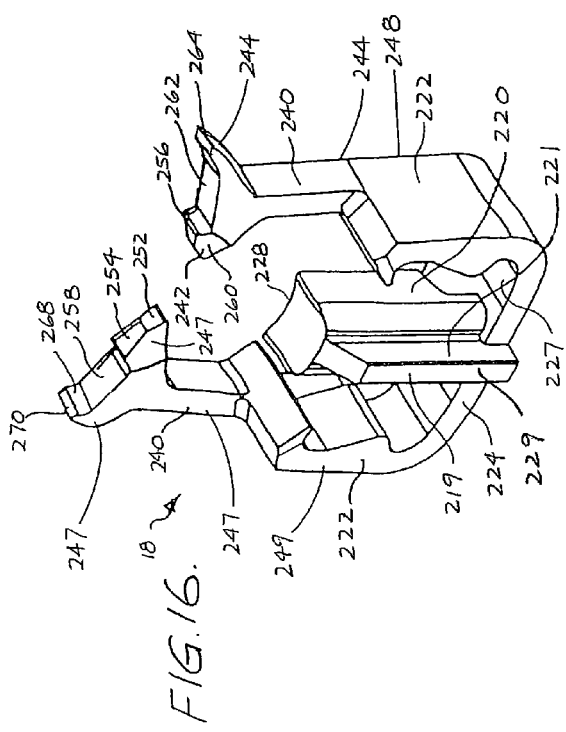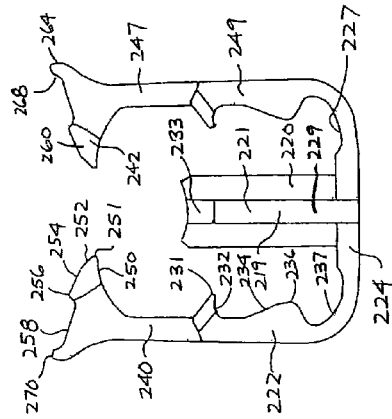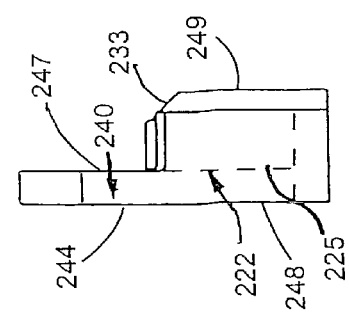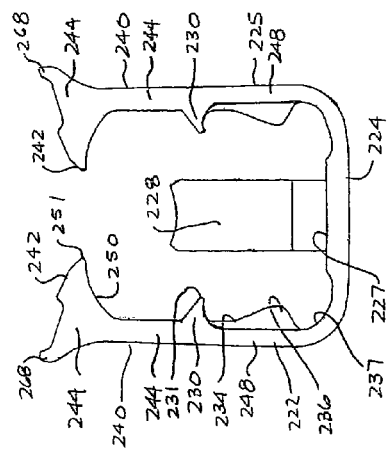

HYBRID QUICK CONNECTOR

This application claims priority pursuant to 35 U.S.C. §120 to U.S. Provisional Application No. 60/790,127, filed Apr. 7, 2006.

BACKGROUND OF THE INVENTION

This invention relates to fluid line systems which include quick connector couplings, and more particularly to a quick connector coupling having a connector body formed of two separate components.

In automotive and other fields, quick connector couplings, which generally include a male member received and sealingly retained in a single piece plastic or metal female connector body having a stem portion formed integral with a retainer housing portion, are often utilized to provide a fluid connection between two components or conduits, thus establishing a fluid line between the two components. Use of quick connector couplings is advantageous in that a sealed and secured fluid line may be established with a minimum amount of time and expense.

A number of methods and mechanisms exist for securing the male member and the female connector body of a quick connector coupling together.

One type of retention mechanism involves use of a retainer in the form of a retention clip inserted through slots formed in the exterior of the connector body. Beams extending through the slots are poised between the male member upset and the rearward surfaces defining the slots, thereby preventing disconnection of the coupling. Due to the physical appearance of such retainers, they are referred to in the trade as "horseshoe" retainers. An example of this type of retainer is found in U.S. Pat. No. 5,586,792, to Kalahasthy et al., which is herein incorporated by reference. The "horseshoe" retainer, disclosed in the '792 patent, permits easy release of the coupling without significantly increasing the complexity of the coupling. Application for U.S. Ser. No. 11/087,358 filed Mar. 23, 2005 disclosed various arrangements of connectors with horseshoe type retainers and a redundant latch/verifier. The disclosure of that application is incorporated by reference herein.

The quick connector coupling of the present invention provides the benefits of high heat application and crash resistance associated with a metal connector body while still provides the benefits of ease of manufacturing associated with an injection molded connector body. The arrangement of the present invention further provides the benefit of tailoring the quick connector coupling for a particular application by using the specific retainer housing and the specific stem best suited for that particular application. It is directed to the provision of a stem for connection element coupled with a separate retainer housing. This invention has application to myriad of quick connectors and is not limited to the particular connector used for illustration.

BRIEF DESCRIPTION OF THE DRAWINGS

FIG. 7 is a bottom view of the retainer housing of FIG. 4.

FIG. 8 is a sectional front view of the retainer housing of FIG. 4, taken along line 8-8 of FIG. 5.

FIG. 9 is a sectional rear view of the retainer housing of FIG. 4, taken along line 9-9 of FIG. 5.

FIG. 16 is a perspective view of the redundant latch/verifier of the quick connector coupling assembly of FIG. 1.

FIG. 17 is a rear view of the redundant latch/verifier of FIG. 16.

FIG. 18 is a side view of the redundant latch/verifier of FIG. 16.

FIG. 19 is a front view of the redundant latch/verifier of FIG. 16.

DETAILED DESCRIPTION OF THE ILLUSTRATED EMBODIMENTS

The quick connector coupling illustrating the present invention is shown in FIGS. 1-31. It is shown as a releasable connection between a rigid tube and other fluid carrying components, particularly a flexible hose. However, the coupling has numerous other applications where a fluid tight, but releasable connection is desired, such as connection of rigid elements of a fluid path, whether pressurized, or unpressurized. One example is an automotive vehicle fuel delivery system. Another example is a fuel filler pipe arrangement for a vehicle.

Figure 1:
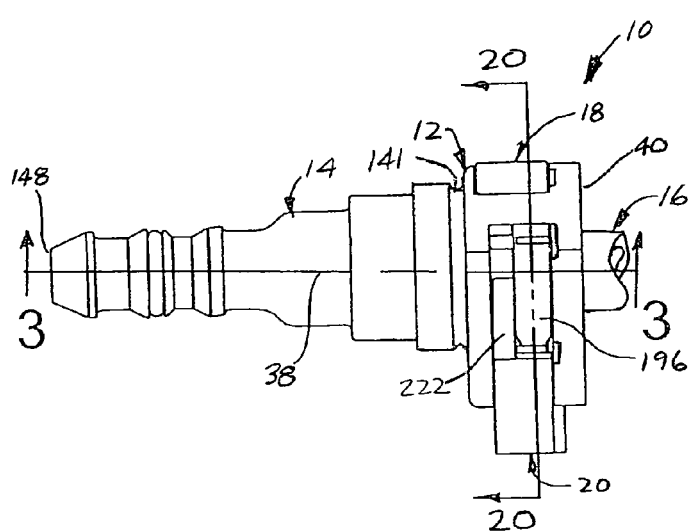
FIG. 1 is a side view of a quick connector coupling assembly embodying the features of the present invention.
Figure 2:
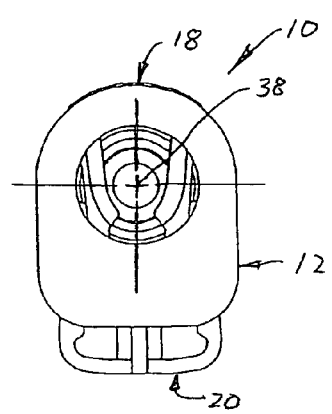
FIG. 2 is a front view of the quick connector coupling assembly of FIG. 1.
Figure 3:
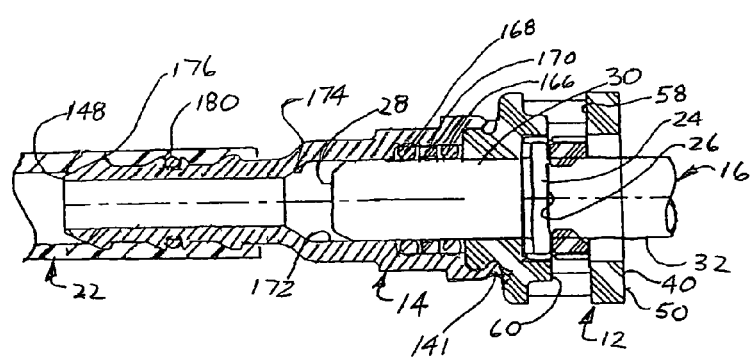
FIG. 3 is a partial sectional bottom view of the quick connector coupling assembly of FIG. 1 taken along line 3-3 of FIG. 1.

FIGS. 1-3 illustrate a quick connector coupling 10 for forming a severable connection in a fluid line. The coupling 10 is comprised of a connector body 11 having a retainer housing 12 and a separate stem 14 secured to the retainer housing 12. A male member 16, best seen in FIG. 3, is releasably secured to the retainer housing 12 by a primary retainer member 18. In this embodiment, a separate a redundant latch/verifier member 20 is employed. Any form of locking retainer may be employed.

The male member 16 is formed at an end of a hollow tube which forms a part of a fluid line system. In use, the stem 14 is connected to a tubing or hose 22 seen in FIG. 3 which is also a part of the fluid line system. The retainer housing 12 and the male member 16 are connectable to form a permanent, but severable, joint in the fluid line.

As illustrated in FIG. 3, the male member 16 is formed at the end of a rigid metal tube. It includes a radially enlarged upset 24 defining a radial abutment surface 26 at a given distance from an open tube end or tip 28. The tube end or tip 28 can be rounded or tapered to make insertion of the male member 16 into connector body 11 less difficult. A smooth generally cylindrical sealing surface 30, defined by the exterior surface of the tube, extends between the upset 24 and the tube end 28. The tube continues in a direction away from the tube end beyond upset 24 and defines a generally smooth cylindrical surface 32. It is generally the same diameter as the cylindrical sealing surface 30.

Figure 5:
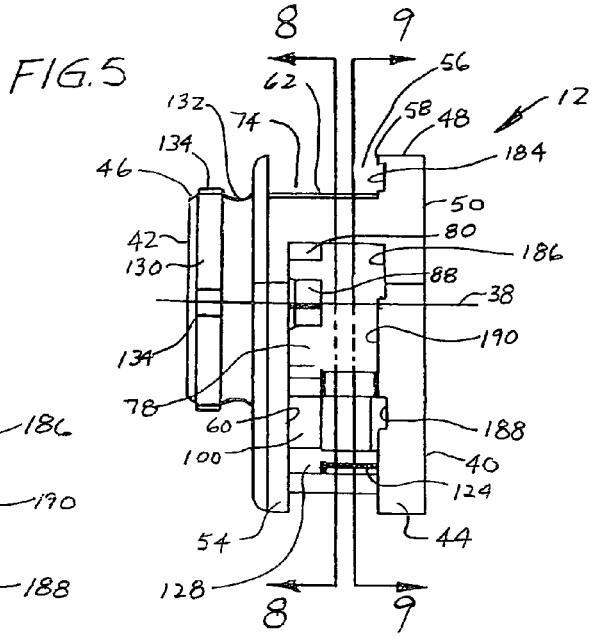
FIG. 5 is a side view of the retainer housing of FIG. 4.
Figure 4:
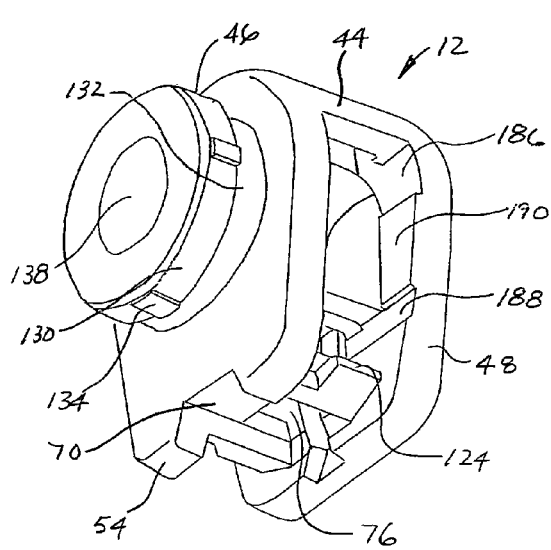
FIG. 4 is a perspective view of the retainer housing of the quick connector coupling assembly of FIG. 1.
Figure 6:
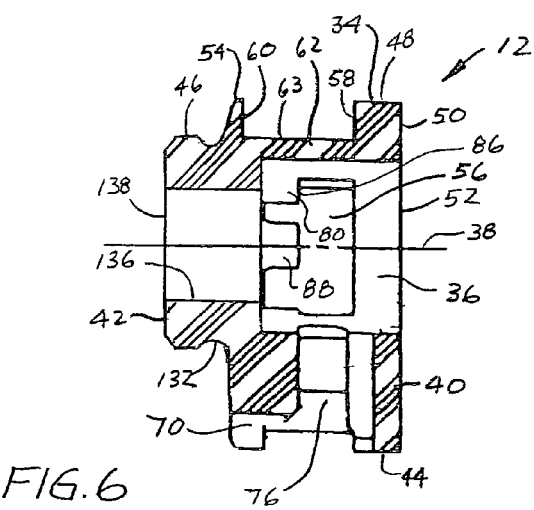
FIG. 6 is a sectional side view of the retainer housing of FIG. 4.

The retainer housing 12 is illustrated in detail in FIGS. 4-9. The retainer housing 12 is preferably made from a non-metallic polymeric material. The retainer housing 12 is more preferably made of a heat resistance plastic (PPA). The retainer housing can also be made from other injection moldable materials including metallic materials which has a thixotropic structure, such as magnesium alloy by using the thixotropic magnesium molding process. As best seen in FIGS. 4-6, the retainer housing 12 is defined by a generally cylindrical stepped wall 34.

The interior surface of wall 34 defines a through bore 36 centered about a longitudinal central axis 38, as illustrated in FIG. 6. It should be noted that the term axial and axially as used herein means longitudinally along the central axis 38. The terms lateral, laterally, transverse and transversely mean in a plane generally perpendicular to the axis 38 toward and away from the axis.

The bore 36 of retainer housing 12 extends completely through the retainer housing 12, from a larger diameter, male member reception end 40 to a smaller diameter, stem connection end 42. Variations in the diameter of wall 34 of retainer housing 12 divide the retainer housing 12 into two distinct portions: a retainer housing portion 44 and an outer spacer portion 46 rearward of the retainer housing portion. It should be noted that the term rearward is used herein to mean in a direction axially from male member reception end 40 toward the stem connection end 42 generally along the central axis 38. The term forward means in a direction axially from the stem connection end 42 toward the male member reception end 40 generally along the central axis 38.

The retainer housing portion 44 is adjacent to the male member reception end 40. It is defined by a forward rim 48 having a transverse planar forward facing surface 50 that defines the entrance hole or opening 52 to through bore 36 at the male reception end 40. Forward rim 48 is spaced from a rearward rim 54 separated by a gap or space 56 open to through bore 36. The axial extent of the space 56 is defined by a rearward facing surface 58 of the forward rim 48 and a forward facing surface 60 of the rearward rim 54. These surfaces 58 and 60 are connected by an arcuate top support member 62, two side support members 64, two center support members 66, and two bottom support members 68, as illustrated in FIGS. 6 and 8. A notch 70 is defined at the bottom of the rearward rim 54. The upper curved surface 63 of top support member 62 is somewhat recessed radially inward from the radially outward most edge of the rearward rim 54. The top support member 62 and the surfaces 58 and 60 define a pocket 72 that receives a cross member of the primary retainer 18.

It should be noted that for purpose of clarity, the quick connector coupling 10 is shown with its longitudinal extent positioned in a horizontal plane and the terms "top," "bottom" and "sides" have been used in describing the retainer housing 12. It will become understood that the "top" configuration is associated with the primary retainer 18 and the bottom configuration is associated with the redundant latch/verifier 20. However, in use, the connector coupling 10 can reside in any orientation without regard to the horizontal and vertical planes and "top" and "bottom" are only relevant to the illustration herein.

The spaces 56 between the top support member 62 and the two side support members 64 define a pair of first or top slots 74. The space 56 between the two center support members 66 and the two bottom support members 68 defines a second or bottom slot 76 directly opposite from top support member 62. The spaces 56 between the two side support members 64 and bottom support members 68 define a pair of third or side slots 78. The slots 74, 76, and 78 are open to the through bore 36.

The top slots 74 receive and position the legs of the primary retainer 18 transversely to the central axis 38 of the retainer housing 12. The bottom slot 76 receives and positions a beam of the redundant latch/verifier 20 transversely to the central axis 38 of the retainer housing 12. Elements of both the primary retainer 18 and the redundant latch/verifier 20 reside in side slots 78.

As best seen in FIGS. 5-6 and 8, the forward facing surface 60 of the rearward rim 54 of the retainer housing 12 includes a series of forward extending axial protrusions or body posts 80, 88, and 100, partially filling the space 56 between the rims 48 and 54. These protrusions or body posts are integrally molded into the retainer housing. A pair of first or upper body posts 80 are disposed at the lateral ends of top support member 62. These upper body posts 80 each include a top curved surface 82. An inner curved surface 84 extends under the upper body posts 80 and the top support member 62. The upper body posts 80 include forward facing surfaces 86, best seen in FIGS. 6 and 8, that face the rearward facing surface 58 of the forward rim 48.

A pair of second or central parabolic shaped body posts 88 include a tip or apex 90 disposed laterally on either side of through bore 36 at approximately 180° (degrees) apart. The parabolic shaped central body posts 88 point radially outward, each includes an upper curved surface 92 and a lower curved surface 94 which join at the apex 90 that resides in a generally horizontal plane that approximately passes through central axis 38. Each central body post 88 further includes a radially inward curved surface 96 that is formed on the same radius of curvature as the radially inner curved surface 84 of the first body posts 80 and the top support member 62. Inner curved surface 84 intersects the lower curved surface 94 at catch 98.

Figure 22:
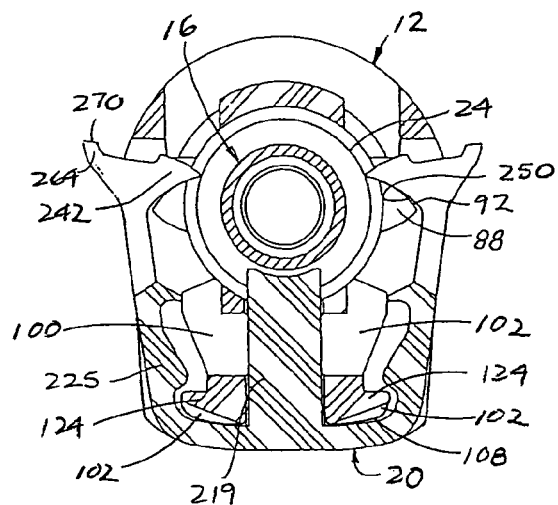
FIG. 22 is a sectional front view similar to FIG. 20, showing the male member fully inserted into the connector body and the redundant latch/verifier in its latched position.
Figure 23:
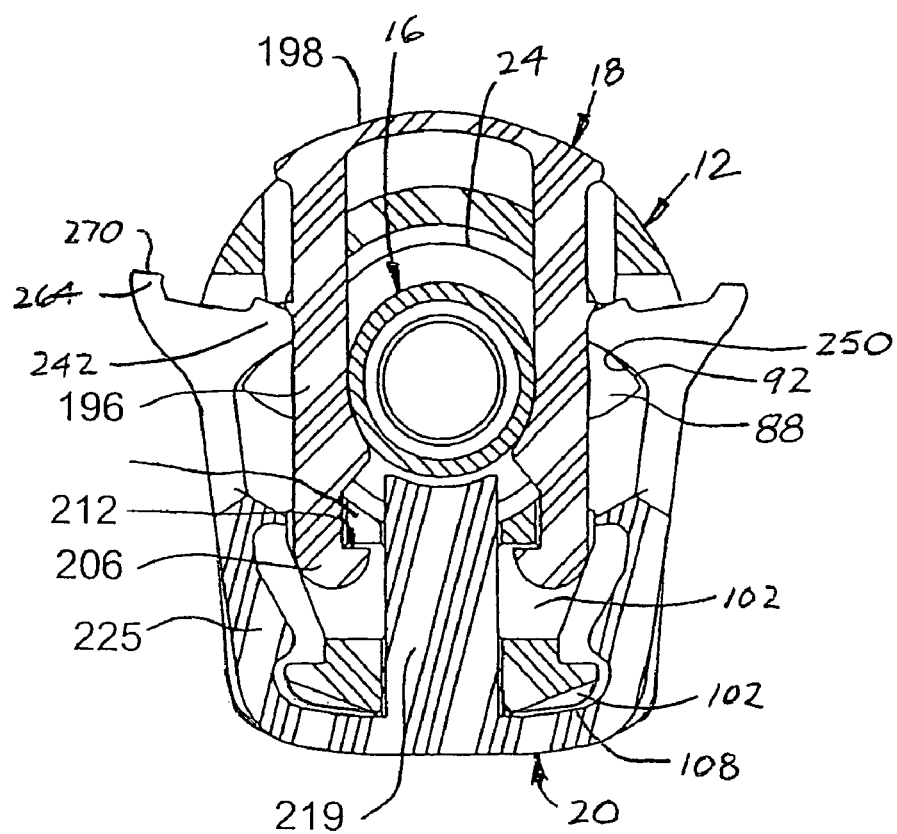
FIG. 23 is a sectional front view similar to FIG. 20, showing the male member fully inserted into the connector body and the primary retainer locked into its latched position with the redundant latch/verifier latched to retain the tube within the connector body.

A third or bottom protrusion or plateau 100 is a solid portion of the retainer housing 12 that extends between center support members 66 and the bottom support members 68. It defines a planar surface 102, best seen in FIGS. 6 and 8, that faces forward towards the rearward facing surface 58 of the front rim 48. The bottom protrusion 100 includes spaced ledges 104 extending transversely outward from center support members 66 at an angle downward in the direction toward the bottom support members 68. The radial or lateral outward extent of bottom protrusion 100 is defined by side ledges 106 that are parallel for a short distance and then converge toward the bottom support members 68 and continue to the bottom ledges 108 outward of the bottom support members 68. The bottom ledges 108 is contoured to match the contour of the retention areas of the redundant latch/verifier 20 when the redundant latch/verifier is in the latched position as shown in FIGS. 22 and 23.

The bottom protrusion 100 further includes radially inner curved surface 110 on the same radius of curvature as the radially inner curved surface 84 defined by upper body posts 80 and curved top support member 62 and the inner curved surfaces 96 of central body posts 88. The inner curved surfaces 84, 96, and 110 are segments of a cylinder and define an upset receiving pocket 112.

The bottom slot 76 includes an enlarged portion that extends laterally between spaced inward facing surfaces 114 of center support members 66 and spaced inward facing surfaces 116 of bottom support members 100, best seen in FIGS. 7 and 8, and a narrowed portion, best seen in FIGS. 7 and 9 that extends transversely between lateral surfaces 118 defined on the rearward facing surface 58 of the forward rim 48. The lateral surfaces 118 are parallel to each other and to surfaces 116 and extend to internal bore 36. The cross section of the bottom slot 76 is generally "T" shaped. The planar surface 102 of the bottom protrusion 100 defines the rearward most surface of the bottom slot 76. A forward most surface 120 defines the front of the bottom slot 76 as seen in FIG. 7.

Each of the center support members 66 defines a locking shoulder 122, best seen in FIG. 8. It will coaction with the primary retainer 18 as will be explained.

A locking ridge 124 extends laterally from the outer edge of each bottom support member 68 and defines a flat 126, best seen in FIGS. 8 and 9. As illustrated in FIG. 5, the locking ridge 124 extends axially from the rearward facing surface 58 of the forward rim 48 to a distance before the forward facing surface 60 of the rearward rim 54; hence, defining a groove 128 between the rearward terminal end of the locking ridge 124 and the forward facing surface 60 of the rearward rim 54. The groove 128 has an axial length slightly larger than the thickness of the extension beam and the verifying tab of the redundant latch/verifier 20 allowing the groove 128 to receive the extension beam and the verifying tab while the redundant latch/verifier 20 is positioned to its unlatched position on the retainer housing 12. The locking ridge functions with the redundant latch/verifier as will be explained.

As illustrated in FIGS. 4, 5 and 9, the rearward facing surface 58 of the forward rim 48 defines a plurality of channels recessed from the rearward facing surface. A pair of first or top channels 184 are formed in between the side support members 64 and the top support member 62. The top channels 184 extend transversely from the top edge of the forward rim 48 to the opening of the forward rim 48 defining the entrance 52. A pair of second or upper side channels 186 are formed below the side support members. The upper side channels 186 extend laterally from the lateral outer edges of the forward rim 48 to the opening defining the entrance 52. A pair of third or lower side channels 188 are formed on the forward rim 48, a distance below the upper side channels 186. A radially inward extending locking pad 190 is formed between each of the upper side channel 186 and the lower side channel 188.

The upper side channels 186, the lower side channels 188, and the locking pads 190 are located and sized such that if the male member 16 is pulled in the axially forward direction, after the male member has been fully inserted into the retainer housing 12; the legs 196 of the primary retainer 18 will be forced axially forward to approximately the axial plane of the upper side channels 186 and the lower side channels 188. At this axial position, the legs 196 of the primary retainer 18 are located radially or laterally inward of the locking pads 190. Should the male member be twisted or rotated when the primary retainer 18 is at this axially forward position, the locking pads 190 prevent the legs 196 from unintentionally spreading apart to an unlocked position.

The spacer portion 46 of the retainer housing 12 is formed axially rearward of the retainer housing portion 44. The exterior surface of the spacer portion 46 includes a generally cylindrical locking surface 130 and an annular depression 132 axially between the locking surface 130 and the rearward rim 54. The cylindrical locking surface 130 includes a plurality of radially extending circumferentially spaced protrusions 134. The stem connection end 42 is rounded or tapered to make insertion of the spacer portion 46 into the stem 14 less difficult.

The interior surface of the spacer portion 46, defining a bore, is defined by a reduced diameter interior surface 136 terminating at an exit hole or opening 138 to through bore 36.

Figure 10:
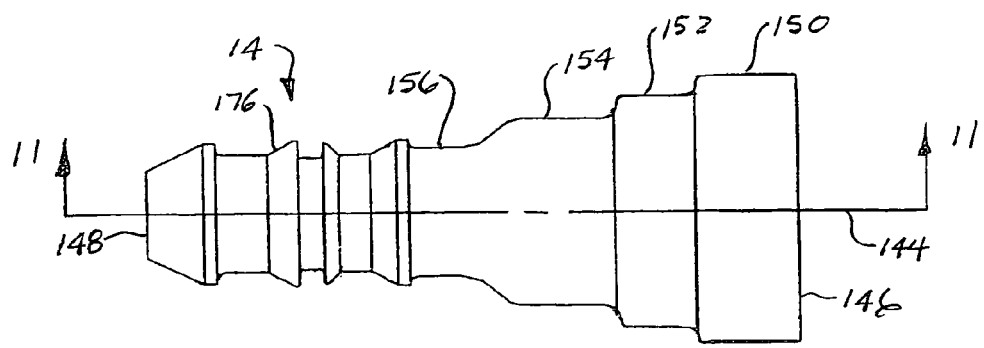
FIG. 10 is a top view of the stem of the quick connector coupling assembly of FIG. 1.
Figure 11:
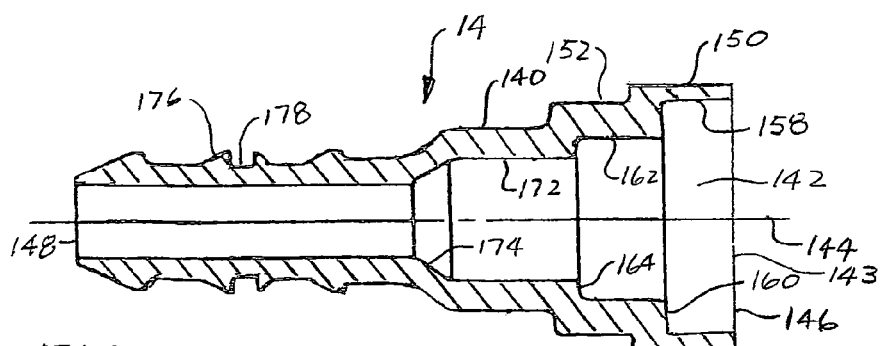
FIG. 11 is a sectional side view of the stem of FIG. 10, taken along line 11-11 of FIG. 10.
Figure 12:
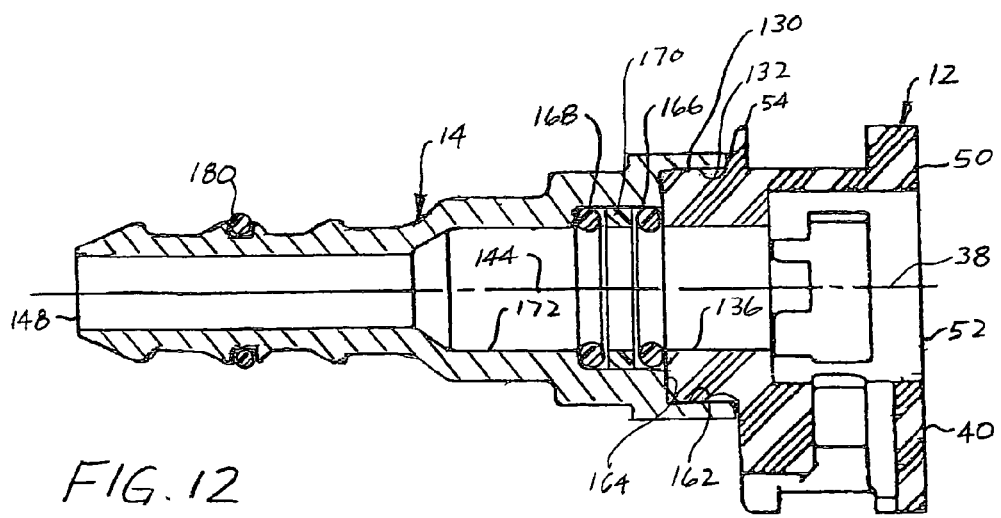
FIG. 12 is a sectional side view of the connector body of FIG. 1 with the stem of FIG. 10 overlying the spacer portion of the retainer housing of FIG. 4.

The stem 14 is illustrated in detail in FIGS. 10-12. The stem is preferably made of a metallic material, such as stainless steel, aluminum or other metals. More preferably, the stem is made of 6000 series aluminum, machine grade. The stem can be formed by a turning process. Alternatively, if the material is an injection moldable material, the stem can be formed by an injection moldable material. The stem 14 is defined by a generally cylindrical stepped wall 140. The interior surface of wall 140 defines a through bore 142 centered about a longitudinal central axis 144, as illustrated in FIG. 11.

The bore of the stem 14 extends completely through the stem, from a larger diameter, housing reception end 146 to a smaller diameter, hose connection end 148. Variation in the diameter of the wall 140 divide the stem into distinction portions. Moving rearward from the housing reception end 146 to the hose connector end 148, they are: spacer housing portion 150, seal chamber portion 152, tube end receptacle portion 154, and fluid passageway portion 156.

The spacer housing portion 150 is adjacent to the housing reception end 146 and defines the entrance hole or opening 143 to through bore 142. The interior surface of the spacer housing portion is defined by a cylindrical spacer housing surface 158 terminating at a first radial shoulder 160. The spacer housing surface 158 has a diameter slightly larger than the diameter of the locking surface 130 of the spacer portion 46 and an axial length slightly longer than the axial length of the spacer portion 46, permitting the entire spacer portion 46 of the retainer housing 12 to fit within the section of the bore 142 defined by the spacer housing surface 158, as illustrated in FIG. 12, without much difficulties.

The seal chamber portion 152 is formed axially rearward of the spacer housing portion 150. The interior surface of the seal chamber portion 152 is defined by a reduced diameter cylindrical seal housing surface 162 extends axially rearward from the small diameter end of the first radial shoulder 160 and terminating at a second radial shoulder 164. The seal chamber portion 152 is provided to house sealing elements to form a fluid seal between the stem 14 and the male member 16.

As illustrated in FIG. 3, situated radially in between the male member 16 and the seal chamber portion 152 are two O-ring seals 166 and 168 separated by a rigid spacer ring 170. The O-rings 166 and 168 are sized to fit tightly within the seal housing surface 162 and tightly around the sealing surface 30 of the male member. The O-rings 166 and 168 are retained in the seal chamber portion 152 by the spacer portion 46 of the retainer housing 12 upon the stem 14 secured to the retainer housing 12. At their retained positions, the O-rings 166 and 168 are coaxial with the spacer portion 46 of the retainer housing 12.

The tube end receptacle portion 136 is formed axially rearward of the seal chamber portion 152. The interior surface of the tube end receptacle portion is defined by a reduced diameter tube end reception surface 172, which extends axially rearward from the small diameter end of the second radial shoulder 164 to a conical shoulder 174. The tube end receptacle surface 172 is sized to receive, and pilot or guide the male member sealing surface 30.

The interior surface of the fluid passageway portion 156 is defined by the smallest diameter interior surface of wall 140. It leads from the small diameter end of conical shoulder 174 to the hose connection end 148. The exterior surface of the fluid passageway portion is configured to facilitate connection to another component in the fluid line. The stem 14 illustrated in FIGS. 3 and 10-12, for example, is specially formed for connection to flexible hose 22 and includes radial barbs 176 and a groove 178 housing an O-ring seal 180 to seal against the interior of hose 22.

It must be understood that the stem 14 may take any desired shape without departing from the invention. It also does not need to be straight. For example, it could include a 45° or a 90° bend between its ends.

Figure 13:
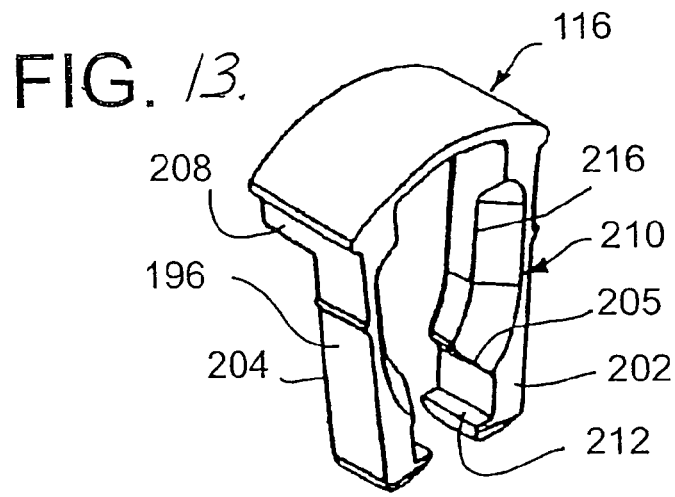
FIG. 13 is a perspective view of the primary retainer of the quick connector coupling assembly of FIG. 1.
Figure 14:
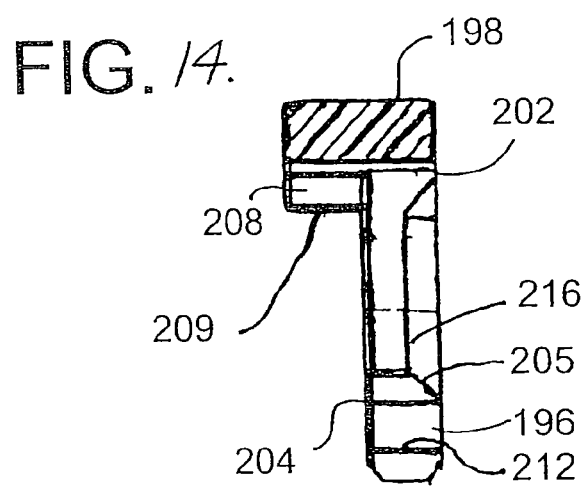
FIG. 14 is a sectional side view of the primary retainer of FIG. 13.
Figure 15:
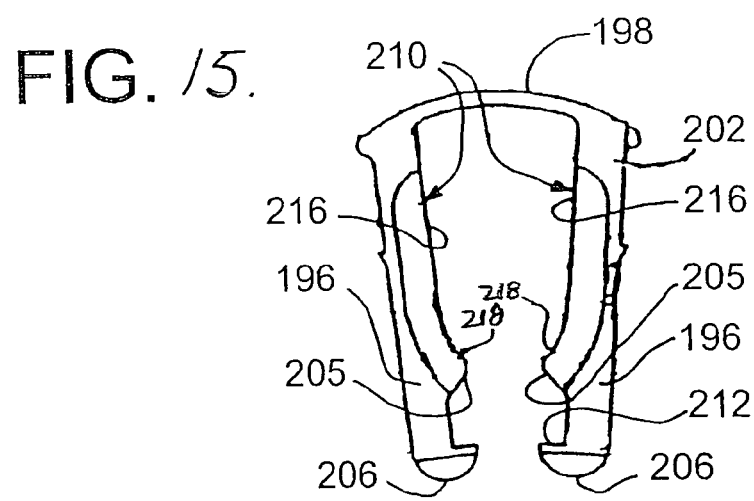
FIG. 15 is a front view of the primary retainer of FIG. 13.

The primary "horse-shoe" type retainer 18 is illustrated in detail in FIGS. 13-15. It is preferably molded of a resilient, flexible material, such as plastic. The primary retainer 18, which extends transversely through the top slots 74 of retainer housing portion 44, is demountably coupled to the retainer housing 12.

The primary retainer 18 includes a pair of elongated, generally parallel legs 196 extending from, and joined at one end by, a cross member 198. Release protrusions 208 are formed on the radially inner surface of cross member 198. The release protrusions 208 extend axially from the rearward face 204 of legs 196 a distance approximately equal to the axial length of upper body posts 80 on either side of the top support member 62. The release protrusions 208 define ramped or camming surfaces 209 that support the central area of cross member 196 in spaced relation to top support member 62 once the primary retainer 18 has been attached to the retainer housing 12. The cross member 198 provides a separation between the legs 196 approximately equal to the outer diameter of the cylindrical sealing surface 30 of male member 16. The legs 196 have an axial length approximately equal to, but slightly less than (to allow clearance), the axial length of the top slots 74 between upper body posts 80 and rearward facing surface 58. The lateral width of the legs 196 is significantly less than the lateral width of the top slots 74, in order to allow outward expansion of the legs 196 to permit male member insertion and release as will be understood.

The cross member 198 has an axial length substantially greater than that of the legs 196. As illustrated in FIG. 14, the cross member 198 is axially aligned with forward faces 202 of the legs 196, but extends axially beyond the rearward faces 204 of the legs 196.

Each leg 196 includes a latch 206 formed at an end remote from the cross member 198. When the primary retainer 18 is fully inserted into the retainer housing 12, the latches 206 lock the primary retainer 18 into position relative to the retainer housing 12. Latching edges 212, defined by the latches 206, engage the locking shoulders 122, defined by the center support members 66 of the retainer housing 12, to releasably lock the primary retainer 18 in place. Each leg 196 includes an angled surface 205 seen in FIG. 15, that coacts with upper lateral outward edges of center support members 66 to urge the primary retainer upward. The resilient property of the legs 196 assures this relationship.

Lead areas 210 are formed into the forward faces 202 of legs 196. These areas 210 slope radially inward and axially rearward from the forward face 202 of each leg, and terminate approximately midway between the forward face 202 and the rearward face 204 of each leg. The spacing between the lead edges of lead areas 210 is at its greatest adjacent the forward face 202. Here, the spacing is approximately equal to the outer diameter or outer perimeters surface of the upset 24 formed on the male member 16. At the inner edges 216 of the lead areas 210, the spacing between the lead areas 210 is approximately equal to the outer diameter of the sealing surface 30 of the male member 16. The portions of the lead areas 210 closer to the latches 206 curve inwardly at 218 to match the annular profile of the male member upset 24. This shape assists in guidance and centering of the male member 16 through the retainer housing 12.

The redundant latch/verifier 20 is illustrated in detail in FIGS. 16-19. It includes elements positioned within the bottom slot 76 and also side slots 78 and is demountably coupled to the retainer housing 12.

It is preferably molded of a resilient, flexible material, such as plastic. The redundant latch/verifier 20 is slidable transversely of the retainer housing 12 relative to bottom support members 68 toward and away from curved top support member 62 and consequently the primary retainer 18 between a radially inner, or latched, position and a radially outer, or unlatched, position.

The redundant latch/verifier 20 includes a connecting member 224 with a radially inward facing surface 227 from which extend retainer beam 219 and a pair of laterally spaced curved generally resilient fingers 222 extending upward from the connecting member 224 and in the same direction as the retainer beam 219. When assembled to the retainer housing 12, inward facing surface 227 generally overlies bottom slot 76 of retainer housing 12 with the retainer beam 219 slidably disposed in the bottom slot 76. Each finger 222 resides in one of the side slots 78.

Each finger 222 includes a knuckle 225 having a laterally inward directed hook 230 with an inward facing tip 231. Nesting areas 232, defined by the hooks 230, engage the locking ridges 124 defined by the bottom support members 68 to releasably secure the redundant latch/verifier 20 to the retainer housing 12 when the redundant latch/verifier is in its outer or unlatched positioned.

Located between the nesting areas 232 of hooks 230 and the connecting member 224, the inner surface of each knuckle 225 defines a transition surface in the form of a ramped surface 234 and a laterally enlarged surface or locking nub 236, and retention areas 237. The distance between the ramped surfaces 234 of the two knuckles 225 is smaller than the distance between the locking ridges 124 of the housing bottom support members 68. The distance between the laterally enlarged surfaces 236 is less than the spacing between the lateral outer edges of locking ridges 124. The distance between retention areas 237 of the two fingers is approximately equal to the distance between the locking ridges 124.

The retainer beam 219 of the redundant latch/verifier 20 includes a laterally enlarged portion 220 and a narrowed portion 221. The lateral width of the enlarged portion 220 is slightly less than the lateral width of the enlarged portion of the bottom slot 76 between inward facing surfaces 114 of the center support members 66 and inward facing surfaces 116 of the bottom support members 68. The lateral width of the narrowed portion 221 is slightly less than the lateral width of the narrowed portion of bottom slot 76 between lateral surfaces 118.

As best seen in FIG. 16, the cross-section of the retainer beam 219 is "T" shaped. The narrowed portion 221 forms the leg of the "T" and the enlarged portion 220 forms the top cross bar of the "T." The retainer beam 219 includes an abutment or rearward facing surface 228 on the enlarged portion 220 that faces the planar surface 171 of the bottom protrusion 100. The retainer beam narrowed portion 221 includes a forward facing surface 229 that faces the narrowed portion of the bottom slot 76 defined between lateral surfaces 118. The retainer beam 219 includes lateral side walls of enlarged portion 220 that are closely spaced and slidable relative to inward facing surfaces 116 of bottom support members 68 and inward facing surfaces 114 of center support members 66. As best seen in FIG. 19, the narrowed portion 221 of the retainer beam 219 includes lateral side walls that are closely spaced and slidable relative to the lateral surfaces 118 of the narrowed portion of bottom slot 76 of the retainer housing 12. The forward facing surface 229 on the narrowed portion 221 of retainer beam 219 includes a chamfer defining by ramp surface 233. When redundant latch/verifier 20 is attached to retainer housing 12, the ramp surface 233 faces forward toward the male member reception end 40 of retainer housing 12.

Each finger 222 of redundant latch/verifier 20 further includes an extension beam 240 extending from the end of the knuckle 225 and terminating at a verifying tab 242 and a transversely outward extending release tab 264 formed at its free or distal end. The rearward facing surfaces 244 of the extension beams 240, the verifying tab 242 and the release tab 264 are planar with the rearward facing surface 248 of the knuckle 225. However, the forward facing surfaces 247 of the extension beams 240, the verifying tabs 242 and the release tab 264 are spaced axially rearward of the forward facing surface 249 of the knuckle 225, as illustrated in FIGS. 16 and 18, such that the axial thickness of the extension beam 240, the verifying tab 242 and the release tab 264 is less than the axial thickness of the knuckle 225. The difference between the thickness of the extension beam 240, the verifying tab 242 and the release tab 264 and the thickness of the knuckle 225 is such that it is at least as large as the thickness or axial length of the upset 24.

As best seen in FIG. 19, each verifying tab 242 includes a rounded edge 250, a first sloped edge 252, a second sloped edge 254 and an inner locking edge 256. The junction of the rounded edge 250 and the first sloped edge 252 forms a point 251. A lead-in ramp surface 260 is formed into the forward face 247 of each verifying tab 242. The lead-in ramp surfaces 260 slopes radially inward and axially rearward from the forward face of each verifying tab 242 and terminate at the first and second sloped edges 252 and 254. The spacing between opposing lead-in ramp surfaces 260 is greatest adjacent the forward faces 247 of the verifying tab 242. The shape and the spacing of the lead-in ramp surfaces 260 match the annular profile of the male member upset 24 allowing the upset 24 to contact the lead-in ramp surface 260 upon insertion of the male member 16 into the retainer housing 12 when the redundant latch/verifier 20 is in the unlatched position. The spacing between opposing first sloped edges 252 is greater than spacing necessary for the cylindrical sealing surface 30 of the male member 16 to be inserted into the retainer housing 12 without contacting the verifying tab 242 when the redundant latch/verifier 20 is the unlatched position. The rounded edge 250 of the verifying tab 242 is shaped and sized to engage the upper curved surface 92 of the central body post 88 when the redundant latch/verifier 20 is in the latched position.

The release tab 264 extends transversely outward, opposite the verifying tab 242. The release tab 264 includes an outer locking edge 268 terminating at an upwardly extending protrusion 270 at one end of the outer locking edge. A body post edge 258 extends from the other end of the outer locking edge 268 to the inner locking edge 256 of the verifying tab 242. The inner locking edge 256, the body post edge 258, and the outer locking edge 268 define a seat 262 for receiving the central body post 88 when the redundant latch/verifier 20 is in the unlatched position.

The assembled quick connector coupling 10 is best seen in FIGS. 1-3. Prior to attaching the stem 14 to the retainer housing 12; the O-rings 166 and 168 and the spacer 170 are first inserted into the section of the bore 142 defined by the seal housing surface 162. With the O-rings 166 and 168 and the spacer 170 properly situated within the seal chamber portion 152 of the stem, the spacer portion 46 of the retainer housing 12 is inserted into the bore 142, through the opening 143 from the housing reception end 146, until the stem 14 contacts the rearward rim 54 of the retainer housing. At this position, the entire spacer position 46 of the retainer housing 12 occupies the section of the bore 142 defined by the spacer housing portion 150, wherein the spacer housing portion 150 is overlying the spacer portion 46 of the retainer housing 12.

The stem 14 is then secured to the retainer housing by crimping the wall 150 of the stem 14, located immediately radially outward of the annular depression 132 of the spacer portion 46, radially inward until a radially inward indentation 141 of the wall 150 caused by the crimping process engages the annular depression 132 to form a fluid tight connection between the stem and the retainer housing. The crimping process of the wall 150 also causes the wall 150 to collapse radially inward around the protrusion 134 extending from exterior surface of the spacer portion 46 to create an interference between the protrusion 134 and the spacer housing surface 158. This interference between the protrusion 134 and the spacer housing surface 158, along with the engagement of the crimped wall 150 with the annular depression 132, prevent the stem 14 from separating from the retainer housing 12 and also prevent the stem 14 from rotating relative to the retainer housing 12. The axis 144 of the stem 14 is approximately in-line with the axis 38 of the retainer housing 12, once the stem is properly secured to the retainer housing.

It should be noted that by connecting an overlying wall of the stem 14 to the outer surface of spacer portion 46 to secure the stem 14 to the retainer housing 12, the joint between the stem 14 and the retainer housing 12 is not along the fluid flow path. This arrangement greatly reduces fluid leaks at the joint.

While the illustrate embodiment discloses crimping the wall 150 of the stem 14 to form a radially inward indentation 141 for securing the stem to the retainer housing 12, other suitable connection arrangements, such as rolled groove, can also be used to for form a radially inward indentation for securing the stem 14 to the retainer housing 12.

With the stem 14 secured to the retainer housing 12, the primary retainer 18 is then attached to the retainer housing 12. The legs 196 of the primary retainer 18 extend through the top slots 74 of the retainer housing portion 44. The primary retainer 18 is oriented such that the cross member 198 and the release protrusions 208 are located above the curved upper surface 63 of top support member 62. The lead areas 210 of the legs 196 face the male member reception end 40.

The primary retainer 18 is attached to retainer housing 12 by insertion of the legs 196 through the top slots 74 by applying a downward or radially inward force on the cross member 198. An increase in downward force is necessary when the legs 196 contact the sides of center support members 66. Applying sufficient downward force, the rounded ends of the legs 196 slide against the sides of the center support members 66, spreading the legs 196 apart and allowing the legs 196 to pass beyond the center support members 66. When the latches 206 on legs 196 clear the center support members 66, the legs 196 spring laterally inward with the latching edges 212 positioned under the locking shoulders 122 of the center support member 66 to releasably lock the primary retainer 18 to retainer housing 12.

Once the primary latch 116 is assembled onto retainer housing 12, the cross member 198 resides in the pocket 72 defined by the rearward facing surface 58 of the forward rim 48, the forward facing surface 60 of the rear rim 54, and the upper curved surface 63 of the top support member 62. The legs 196 extend into the side slots 78 through the gap between the top support member 62 and the side support members 146, and between the upper body posts 80 and the rearward facing surface 58 of the forward rim 48.

As seen in FIG. 1, in the properly attached position, the legs 196 are disposed axially between rearward facing surface 58 of the forward rim 48 and the planar surface 102 formed on the bottom protrusion 100. The ramped surfaces 209 of the release protrusions 208 rest on the top curved surfaces 82 of the upper body post 80. If a radially inward pressure is applied to the center of cross member 198 to urge the cross member toward the top support member 62, the ramped surfaces 209 contact and slide or cam against the upper body posts 80 causing the legs 196 to spread apart, with the latches moving transversely outward within side slots 78. This action permits release of the male member 16 should withdrawal of the male member from the retainer housing 12 if desired.

A properly attached primary retainer 18 is illustrated in FIGS. 1 and 23. In the attached position, the legs 196 of the primary retainer 18 are approximately perpendicular to the axis 38 of the bore 36 when viewed from the side. When viewed from the rear or the front, the legs 196 are approximately equally spaced from the axis 38 of the bore 36.

Figure 20:
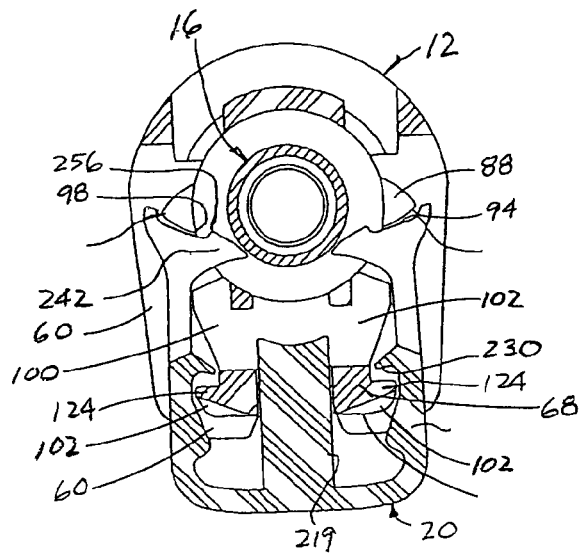
FIG. 20 is a sectional front view of the quick connector coupling assembly of FIG. 1 taken along line 20-20 in FIG. 1, with the primary retainer removed for clarity, showing the male member partially inserted into the connector body and the redundant latch/verifier in its unlatched position.

With the primary retainer 18 properly attached to the retainer housing 12, the redundant latch/verifier 20 is next mounted to the retainer housing 12 in its unlatched position by insertion of the fingers 222 in the transversely upward or radially inward direction, through the side slots 78, until the hooks 230 of the knuckles 225 capture the locking ridges 124 of the bottom support members 68 and the body post edges 258 of the fingers 242 are in abutting relationship with the lower curved surfaces 94 of the central body posts 88, as illustrated in FIG. 20. Simultaneously, the retainer beam 219 of the redundant latch/verifier 20 is inserted into the bottom slot 76 of the retainer housing 12. In the unlatched position, the extension beams 240 and the verifying tabs 242 are positioned axially in between the forward facing surface 60 of the rearward rim 54 and the legs 196 of the primary retainer, as illustrated in FIG. 1. Also in the unlatched position, the upper portion of the knuckle 225 is positioned axially between the forward facing surface 60 of the rearward rim 54 and the rearward facing surface 58 of the forward rim 48.

In this unlatched position, the redundant latch/verifier 20 is restrained from axially and radially movements relative to the retainer housing 12. The abutting relationships of the rearward faces 244 of extension beams 240 and 248 of knuckle 225 with the forward facing surface 60 of rearward rim 54 restrain the redundant latch/verifier 20 from rearward axial movement. The abutting relationships of the forward faces 249 of knuckles 225 with the rearward facing surface 58 of forward rim 48 restrain the redundant latch/verifier 20 from forward axial movement.

The extension beams 240 are nested in side slots 78 rearward of the legs 196 of primary retainer 18. Forward facing surfaces 247 of the extension beams 240 are closely adjacent rearward faces 204 of legs 196. The engagements of the hooks 230 of fingers 222 with the locking ridges 124 restrain the redundant latch/verifier 20 from radially outward or transversely downward movement. Furthermore, in the unlatched position, the central body posts 88 are situated in the seats 262, defined by the inner locking edges 256, the body post edges 258 and the outer locking edges 268 of the fingers 242, with the catch 98 of the central body post 88 immediately laterally outward of the locking edge 256 of the verifying tab 242. The abutting relationship of the body post edges 258 of the verifying tabs 242 with the lower curved surfaces 94 of the central body posts 88 restrain the redundant latch/verifier 20 from radially inward or transversely upward movement. The abutting relationships of the inner locking edges 256 of the verifying tabs 242 with the catch 98 prevent the fingers 222 from spreading laterally outward, thus, maintain the abutting relation of the body post edges 258 with the lower curved surfaces 94 even if a significant amount of radially inward or transversely upward force is applied to the redundant latch/verifier 20. In this condition, the redundant latch/verifier cannot be moved from the unlatched position.

With redundant latch/verifier 20 attached to the retainer housing 12 in its unlatched position, the male member 16 may be inserted axially into the connector body 11 to complete a fluid path. As the male member 16 is inserted axially, the end or tip 28 of male member 16 moves rearward and contacts each lead sloping surface 210 defined on legs 196 of primary retainer 18. The sealing surface 30 of the male member 16 passes between legs 196 and into seal chamber portion 152 of the stem 14 with little or no resistance, since the spacing between the legs 196 is approximately equal to the outer diameter of the sealing surface 30 of male member 16.

Resistance to insertion occurs when the upset 24 of the male member 16 contacts the legs 196. The lead areas 210 of the legs 196 permit passage of the upset 24 between the legs 196 only upon applying sufficient axially rearward force. As the upset 24 passes between legs 196, it rides along the lead areas 210 and flexes the legs 196 radially or laterally outward. Once the upset 24 has passed the legs 196 of the primary retainer 18, the upset 24 contacts the lead-in ramp surfaces 260 of the verifying tabs 242 situated immediately axially rearward of the legs 196. The upset engages the lead-in ramp surfaces 260 of the verifying tabs 242 and flexes the fingers 222 of the redundant latch/verifier 20 radially or laterally outward while the legs 196 of the primary retainer 18 spring back into place behind the upset 24 to a locked position. Since the thickness of the verifying tabs 242 is slightly greater than the axial length of the male member upset 24, the entire length of the upset 24 is able to be located in between the verifying tabs 242 once the fingers 222 of the redundant latch/verifier 20 have flexed radially or laterally outward to accommodate the upset 24.

With the primary retainer 18 in the locked position, the rearward faces 204 of the legs 196 abut the upset abutment surface 26 to prevent withdrawal of the male member 16 from the connector body 11. Abutting relationship of the upset 24 with the forward facing surface 60 of the rearward rim 54 prevents further rearward insertion of male member 16 into the connector body 11.

Figure 21:
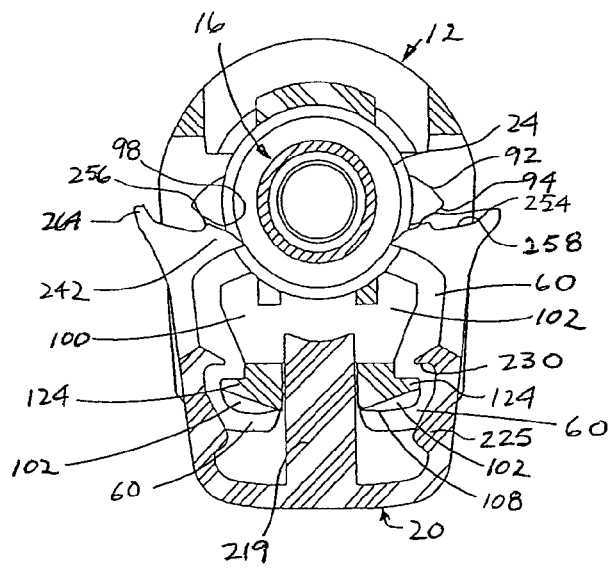
FIG. 21 is a sectional front view similar to FIG. 20, showing the male member fully inserted into the connector body and the redundant latch/verifier in an intermediate position between its unlatched position and its latched position.

With the legs 196 of the primary retainer 18 in the locked position, the upset 24 flexes the fingers 222 of the redundant latch/verifier 20 laterally outward in side slots 78 to the position illustrated in FIG. 21. Since the verifying tabs 242 are located transversely below the axis 38 of the bore 36, and likewise below the axis of the male member 16; as the male member 16 is inserted rearward into the connector body 11, the lower hemisphere of the upset 24 contacts the lead-in ramp surfaces 260 of the fingers 222. Contacting the lower hemisphere of the upset 24 with the fingers 222 not only applies a rearward directed force on the fingers 222, but it also apply a downwardly directed force on the fingers 222 pushing the redundant latch/verifier 20 transversely downward, or radially outward away from the axis of the male member 16, allowing the inner locking edges 256 to be located transversely below the catches 98 of the central body posts 88. With the inner locking edges 256 clear of the catches 98, the fingers 222 are able to spread radially or laterally outward, without interference, to a position in which the second sloped edge 245 is situated immediately below the lower curved surfaces of the central body posts as illustrated in FIG. 21.

It should be noted that the arrangement of the primary retainer 18 and the redundant latch/verifier 20 in this embodiment, namely locating the verifying tab 242 of the redundant latch/verifier 20 immediately axially rearward of the legs 196 of the primary retainer 18, assures that the fingers 222 of the redundant latch/verifier 20 are able to spread laterally outward only after the upset 24 has completely passed the legs 196 of the primary retainer 18. In other words, the fingers 222 of the redundant latch/verifier 20 are able to spread outward only after the male member 16 has been fully inserted into the connector body 11 and the legs 196 of the primary retainer 18 is in the locked position.

The connector assembly is completed by positioning the redundant latch/verifier 20 to a latched position. To position the redundant latch/verifier 20 to the latched position, a transversely upward or radially inward force (toward the retainer housing 12) is applied to the connecting member 224. With sufficient transversely upward or radially inward force, the sloped edges 252 and 254 of the verifying tabs 242 slide against the lower curved surfaces 94 of the central body posts 88, further spreading the fingers 222 apart and allowing the points 251 of the verifying tabs 242 to surpass the tips or apexes 90 of the central body posts 88. Once the points 251 of the verifying tabs 242 surpass the tips 90 of the central body posts 88, the fingers 222 snap laterally inward to the latched position in which the rounded edges 250 of the verifying tabs engage the upper curved surfaces 92 of the central body posts as shown in FIGS. 22 and 23. Also in the latched position, the release tabs 264 extend laterally outward through the side slots 78 allowing easy access to the protrusion 270 of the release tabs. The engagement of the rounded edges 250 with the upper curved surfaces 98 prevents the redundant latch/verifier 20 from being unintentionally moved transversely downward or radially outward from the retainer housing 12 to the unlatched position.

Furthermore, as the redundant latch/verifier 20 is moved to its latched position transversely toward the primary retainer 18, the locking ridges 124 of the bottom support members 68 are urged out of nesting areas 232 of the fingers 222. Ramped surface 234 ride upon locking ridges 124 and flex the fingers 222 outward causing them to spread apart and permit the locking nubs 236 to pass the locking ridges 124 which then are caused to reside between retention areas 237. The redundant latch/verifier 20 is then also releasably retained in the latched position by the resilient nature of the fingers 222 and the coaction of the retention areas 237 with the locking ridges 124 by the abutting relationship of the locking nubs 236 with the locking ridges 124. With the redundant latch/verifier 20 in its latched position, the hooks 230 at the free ends of fingers 222 are positioned in the side slots 78 laterally outward of the latches 206 at the free ends of legs 196. The distance between the inner surfaces of the hooks 230 on fingers 222 is slightly greater than the distance between the outer surface of the legs 196 of the primary retainer 18 at latches 206. The axial width of the fingers 222 is approximately equal to the axial width of the legs 196. Notably, the length of the fingers 222 is such that when the redundant latch/verifier 20 is in the latched position, the fingers 222 interfere with outward flexing of the legs 196 thus assuring that the fingers 196 remain locked to locking shoulders 122 of center support member 66. Since, the bottom ledges 108 of the bottom protrusion 100 is contoured to match the contour of the retention areas 237 of the redundant latch/verifier 20, the locking ridges 124 are better able retain the redundant latch/verifier 20 in its latched position when the locking ridges 124 reside between the retention areas 237.

At the same time, the retainer beam 219 is moved transversely upward or radially inward toward the male member 16. In the latched position, the rearward facing surface 228 of the retainer beam 219 is in axial abutting relationship with the abutting surface 26 of upset 24 of the male member 16. This axial abutting relationship between the retainer beam 219 and the upset 24 also prevents the male member 16 from moving axially outward of the male member reception end 40 and provides the redundant latch feature to retain the male member 16 in the retainer housing 12. Hence, the redundant latch/verifier 20 is able to independently retain the male member 16 of the tube in the connector body 11 should the primary retainer 18 fail.

As discussed previously, with the redundant latch/verifier 20 in the unlatched position, the fingers 222 of the redundant latch/verifier 20 are able spread transversely outward only after the male member 16 has been fully inserted into the connector body 11. Hence, for the redundant latch/verifier 20 to be positioned in the latched position, by applying a transversely upward or radially inward force to the connecting member 224 when the inner locking edges 256 are clear of the catches 98, likewise requires the male member 16 to have been fully inserted into the connector body 11. Therefore, the redundant latch/verifier 20 in the latched position provides a visual verification that the male member 16 has been fully inserted into the connector body 11.

The redundant latch/verifier 20 may be intentionally dislodged and moved to its unlatched position, by forcing the redundant latch/verifier 20 downward or radially outward from the retainer housing 12, for example by inserting a screwdriver blade into the notch 70 to pry the connecting member 224 of the redundant latch/verifier 20 radially outward or transversely downward from the retainer housing 12. Alternatively the redundant latch/verifier 20 may be intentionally dislodged and moved to its unlatched position by simply pulling the protrusions 270 of the release tabs 264, extending through the side slots 78, transversely downward.

By pulling the protrusions 270 downward, the rounded edges 250 of the verifying tabs 242 cam against the upper curved surfaces 92 of the central body posts 88 spreading the fingers 222 laterally outward. Once the points 251 of the verifying tabs 242 surpass the tips 90 of the central body post 88, the fingers 242 snap inward to the unlatched position.

With the redundant latch/verifier 20 positioned in the unlatched position; release of the male member 16 from a locked position behind legs 196 can be achieved by exerting a transversely downward or radially inward force on the cross member 198 of the primary retainer 18. Radially inward force on the cross member 198 causes the ramped surfaces 209 on release protrusions 208 to contact the top curved surfaces 82 of the upper body posts 80 of retainer housing 12. The ramped surfaces 209 of the release protrusions 208 slide or cam against the upper body posts 80, causing the legs 196 of the primary retainer 18 to spread laterally apart as application of downward force continues. Eventually, the legs 196 will be spread apart to a released position in which the distance between them is sufficient to allow removal of the upset 24. The male member 16 may thus be withdrawn from the connector body 11. Upon withdrawal of the member 114 from the connector body 11 and relaxation of primary retainer 18, the primary retainer 18 returns to its normal installed position with the cross members 198 urged upwardly by coaction of the angled surfaces 205 against center support members 66.

Figure 24:
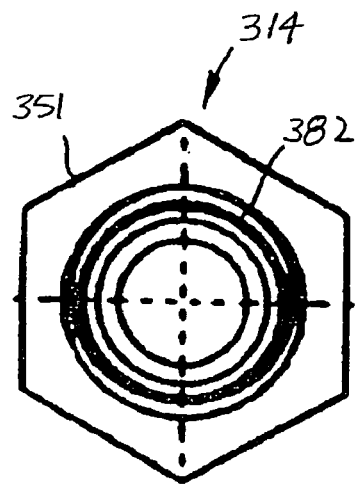
FIG. 24 is a front view of an alternative stem with external threads.
Figure 25:
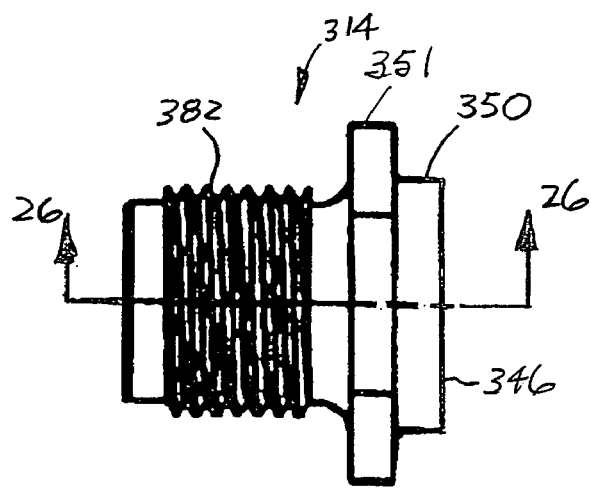
FIG. 25 is a top view of the stem of FIG. 24.
Figure 26:
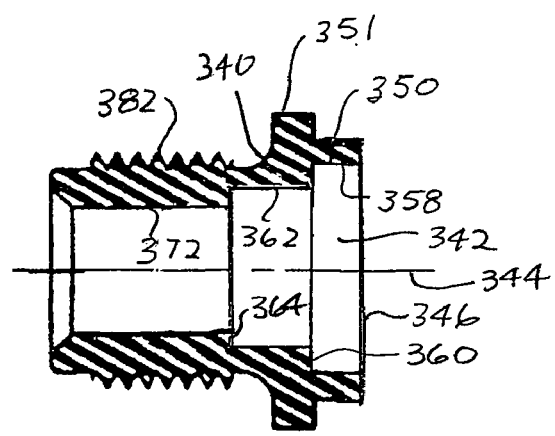
FIG. 26 is a sectional side view of the stem of FIG. 25 taken along line 26-26 in FIG. 25.

As stated, this invention has wide application to quick connector that have a connector body with a connection portion and a retainer portion. As an example, FIGS. 24-26 illustrate a connector body embodying the features of the present invention with a modified form of the stem in which radially outward extending threads 382 are formed on the exterior surface of a stem 314. The stem 314 is defined by a generally cylindrical step wall 340. The exterior surface of the stem 314 includes a radially outward extending hexagonal rim 351 and exterior threads 382. The hexagonal rim 351 allows the use of a wrench to tighten or torque the stem 314 to a mating component with internal threads, such as the master cylinder of an automobile.

The interior surface of wall 340 defines a through bore 342 centered about a longitudinal central axis 344. The bore 342 of the stem 314 extends completely through the stem from a housing reception end 346. The stem 314 includes a spacer housing portion 350, located axially between the housing reception end 346 and the hexagonal rim 351. Similar to the stem 14 of the first embodiment, the spacer housing 350 overlies the spacer portion 46 of the retainer housing 12, wherein the spacer housing 350 is crimped radially inward to secure the stem 314 to the retainer housing 12.

The interior surface of the wall 340 is defined by a cylindrical spacer housing surface 358 terminating at a first radial shoulder 360. A reduced diameter cylindrical seal housing surface 362 extends axially rearward from the small diameter end of the first radial shoulder 360 and terminating at a second radial shoulder 364. The cylindrical seal housing surface 362 defines a chamber to house sealing elements to form a fluid seal between the stem 314 and the male member 16. A reduced diameter tube end receptacle surface 372 extends axially rearward from the small diameter end of the second radial shoulder. The tube end receptacle surface 372 is sized to receive, and pilot or guide the male member sealing surface 30.

One advantage the multi-piece connector body of the present invention has over the prior art one piece connector body is that the multi-piece connector body of the present invention allows for different shaped stems to be secured to a common retainer housing. Likewise, a common stem can be secured to different retainer housings. Such a modular arrangement greatly reduces the complexity. Another advantage the multi-piece connector body of the present invention has over the prior art connector body is that for stems with a bend between its ends, the same stem and the same retainer can be used to make a plurality of connector body arrangements in which the angled portions of the bent stems are at different rotational orientations. This allows the retainer or locking mechanism to be in the same place or orientation when the connector is installed in an automobile.

Figure 27:
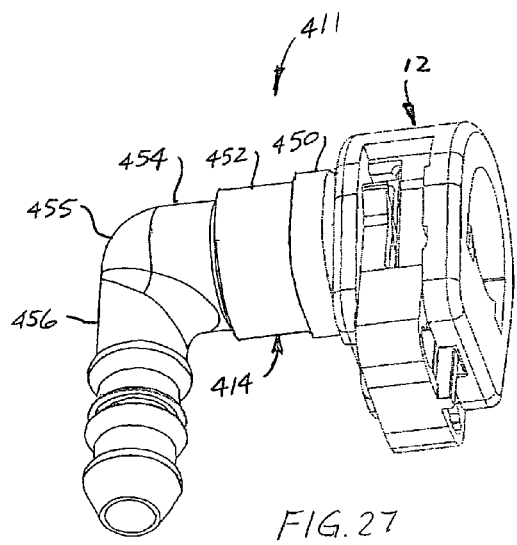
FIG. 27 is a perspective view of an alternative stem, with a 90° bend between its ends, secured to a retainer housing.
Figure 28:
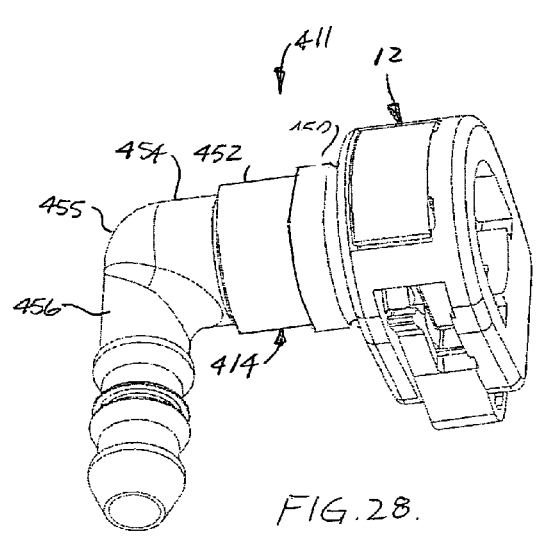
FIG. 28 is a perspective view of the stem of FIG. 27 with the stem secured to the retainer housing at a different rotational orientation.

FIGS. 27-28 illustrate such an alternative connector body comprising a stem having an approximately 90° bend between its ends. The connector body 411 comprises a retainer housing 12 and a stem 414. The retainer housing 12 is the same as the retainer housing 12 of the first embodiment. The stem 414 includes a spacer housing portion 450, a seal chamber portion 452, a tube end receptacle portion 454, a bend portion 455, and an angled fluid passage portion 456. The centerline of the tube end receptacle portion 454 is in-line with the centerline of the spacer housing portion 450 and the centerline of the seal chamber portion 452. The centerline of the fluid passage portion 456 is approximately 90° from the centerline of the tube end receptacle portion 454. As with the stem 14 of the first embodiment, the spacer housing portion 450 of the stem overlies the spacer portion 46 of the retainer housing 12. The spacer housing portion 450 is crimped radially inward to secure the stem 414 to the retainer housing 12. Once the stem 414 has the been secured to retainer housing 12, the interference between the protrusions 134 of the spacer portion 46 and the interior surface of the spacer housing portion 450 prevents the stem 414 from rotating relative to the retainer housing 12. Hence, the stem 414 will remain at same rotational orientation relative to the retainer housing 12 once the stem 414 has been secured to the retainer housing 12. FIG. 27 illustrates the connector body 411 in which the stem is rotationally oriented such that the angled fluid passage portion 456 of the stem 414 is directed toward the bottom of the connector body 11. FIG. 28 illustrates another connector body arrangement with the same stem 414 and the same retainer housing 12 in which the stem 414 is rotationally oriented such that the angled fluid passage portion 456 is directed toward the side of the connector body 411. It should be noted that the rotational orientation of the stem 414 is not limited to the two positions illustrated in FIG. 27-28 but can be at any desired rotational orientation relative to the retainer housing 12.

Figure 29:
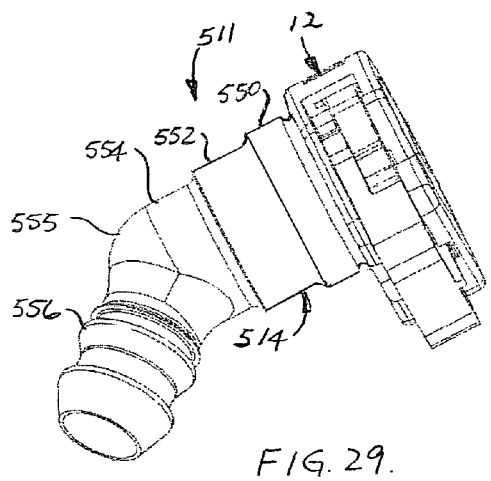
FIG. 29 is a perspective view of an alternative stem, with a 45° bend between its ends, secured to a retainer housing.
Figure 30:
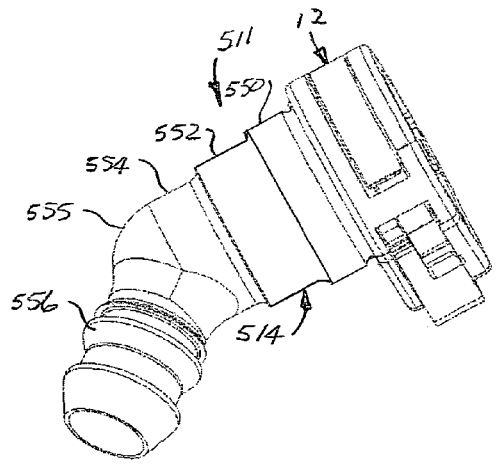
FIG. 30 is a perspective view of the stem of FIG. 29 with the stem secured to the retainer housing at a different rotational orientation.

Furthermore, the bend between the ends of the stem need not be limited to a 90° bend, but can be at any angle between 0° to 90°. FIGS. 29-30 illustrate another alternative connector body 511 comprising a stem 514 having an approximately 45° bend between its ends. The stem 514 includes a spacer housing portion 550, a seal chamber portion 552, a tube end receptacle portion 554, a bend portion 555, and an angled fluid passage portion 556. The centerline of the tube end receptacle portion 554 is in-line with the centerline of the spacer housing portion 550 and the centerline of the seal chamber portion 552. The centerline of the fluid passage portion 556 is approximately 45° from the centerline of the tube end receptacle portion 554. FIG. 29 illustrates the connector body 511 in which the stem is rotationally oriented such that the angled fluid passage portion 556 of the stem 514 is directed toward the bottom of the connector body 511. FIG. 30 illustrates another connector body arrangement with the same stem 514 and the same retainer housing 12 in which the stem 514 is rotationally oriented such that the angled fluid passage portion 556 of the stem 514 is directed toward the side of the connector body 511.

Figure 31:
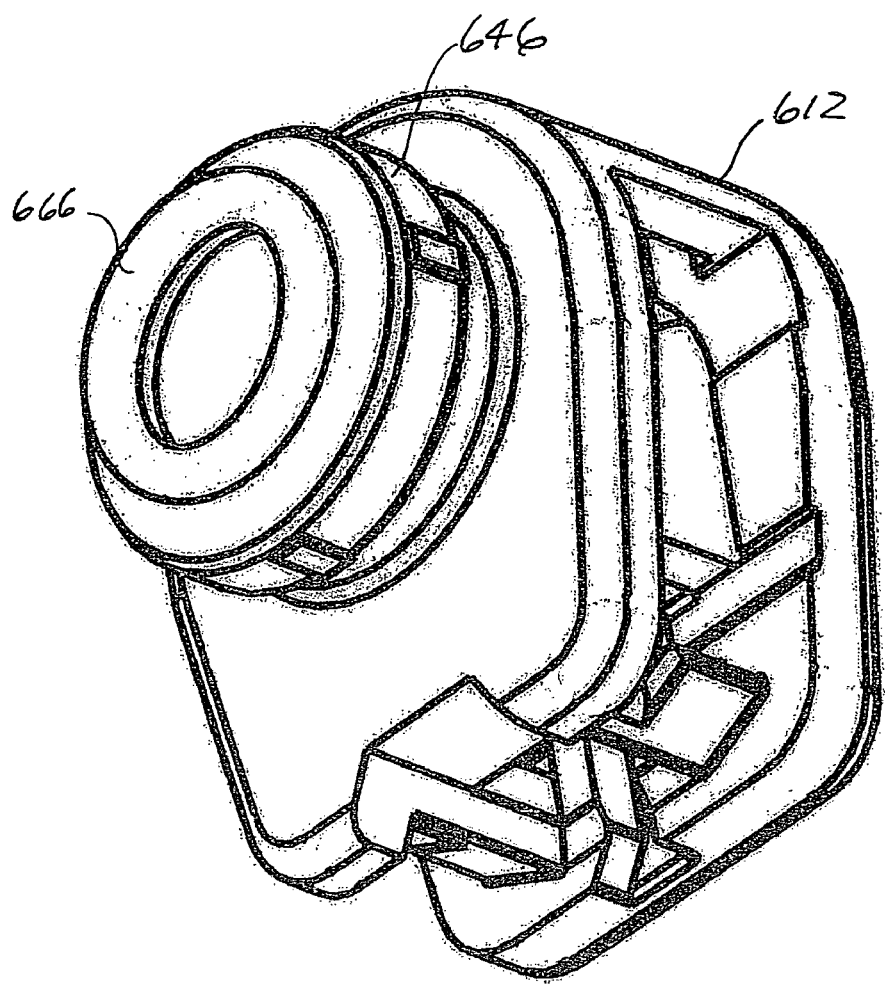
FIG. 31 is a perspective view of an alternative retainer housing.

FIG. 31 illustrates an alternative retainer housing 612 embodying the features of the present invention. The retainer housing 612 is similar to the retainer housing 12 but includes an O-ring 666 integrated with the retainer housing by permanently attaching the O-ring 666 with the spacer portion 646 of the retainer housing 612. The O-ring 666 is preferably attached to the retainer housing 612 by overmolding the spacer portion 646 of the retainer housing 612 over the O-ring 666 such that the radially inner surface of the O-ring 666 is radially inward of the bore extending through the retainer housing 612. The O-ring 666 can also be attached to the retainer housing 612 by bonding the O-ring 666 to the axially rearward annular surface of the spacer portion 646 through the use of an adhesive. The integrated O-ring 666 and retainer housing 612 allows for easier and faster assembly of the stem 14 to the retainer housing 612 by eliminating the process of first inserting an O-ring into the section of the bore 142 defined by the seal housing surface 162.

Various features of the present invention have been explained with reference to the embodiments shown and described. It must be understood that numerous modifications may be made without departing from the spirit and scope of the invention as defined by the appended claims.

The invention claimed is:

1. A quick connector coupling for forming a severable connection in a fluid line comprising a connector body, said connector body comprising:
    a retainer housing defining a though bore extending axially rearward from a male member reception end, said retainer housing including a spacer portion defining a continuous generally cylindrical locking surface, said spacer portion of said retainer housing further defining an annular depression adjacent said generally cylindrical locking surface;
    a retainer in the retainer housing to secure a male member within said retainer housing; and
    a separate stem secured to said retainer housing, said stem defining a through bore extending axially rearward from a housing reception end, said stem including a spacer housing portion having an interior cylindrical spacer housing surface overlying said generally cylindrical locking surface of said spacer portion of said retainer housing
    said spacer housing portion having a crimped wall defining a radially inward indentation radially outward of said annular depression crimped into said annular depression said interior cylindrical spacer housing surface engaging said generally cylindrical locking surface of said spacer portion to secure said stem to said retainer housing;
    wherein said continuous generally cylindrical locking surface of said spacer portion of said retainer housing includes a plurality of radially outward extending protrusions engaging said interior cylindrical spacer housing surface of said stem to create an interface fit between said protrusions and the interior cylindrical spacer housing surface to prevent said stem from rotating relative to said retainer housing.

2. The quick connector coupling as claimed in claim 1 wherein said spacer portion is located at an end of said retainer housing oppose said male member reception end.

3. The quick connector coupling as claimed in claim 1 further comprising a male member extending through said male member reception end of said retainer housing and into said bores of said retainer housing and said stem, said male member having a generally cylindrical sealing surface and an annular upset, said upset having a diameter greater than the diameter of said tubular surface.

4. The quick connector coupling as claimed in claim 3 further comprising an O-ring located radially between said male member and said stem.

5. The quick connector coupling as claimed in claim 4 wherein said O-ring is coaxial with said spacer portion of said retainer housing.

6. The quick connector coupling as claimed in claim 4 wherein said spacer portion of said retainer housing is located immediately axially forward of said O-ring.

7. The quick connector coupling as claimed in claim 4 further comprising a second O-ring located radially between said male member and said stem.

8. The quick connector coupling as claimed in claim 7 further comprising a spacer ring axially between said O-ring and said second O-ring.

9. The quick connector coupling as claimed in claim 1 wherein said retainer housing is formed of a material different than material forming said stem.

10. The quick connector coupling as claimed in claim 9 wherein said retainer housing is formed of an injection moldable material.

11. The quick connector coupling as claimed in claim 9 wherein said retainer housing is formed of a non-metallic material.

12. The quick connector coupling as claimed in claim 11 wherein said non-metallic material is a polymeric material.

13. The quick connector coupling as claimed in claim 9 wherein said retainer housing is formed of a metallic material.

14. The quick connector coupling as claimed in claim 13 wherein said metallic material has a thixotropic structure.

15. The quick connector coupling as claimed in claim 13 wherein said metallic material is a magnesium alloy.

16. The quick connector coupling as claimed in claim 1 wherein said stem is formed of a metallic material.

17. The quick connector coupling as claimed in claim 1 wherein said spacer housing portion of said stem defines an interior surface, said stem further includes a seal chamber portion and a tube end receptacle portion, said seal chamber portion defines an interior surface having a diameter smaller than diameter of said interior surface of said spacer housing portion, said tube end receptacle portion defines an interior surface having a diameter smaller than diameter of said inner surface of said seal chamber portion.

18. The quick connector coupling as claimed in claim 1 wherein said stem includes a radially outward extending barb.

19. The quick connector coupling as claimed in claim 1 wherein said stem includes threads.

20. The quick connector coupling as claimed in claim 19 wherein said threads extend radially outward.

21. The quick connector coupling as claimed in claim 1 wherein said stem is straight.

22. The quick connector coupling as claimed in claim 1 wherein said stem includes a bend between its ends.

23. The quick connector coupling as claimed in claim 22 wherein said bend is approximately ninety degrees.

24. The quick connector coupling as claimed in claim 22 wherein said bend is approximately forty-five degrees.

* * * * *